Feb. 13, 1934.  E. NYGAARD  1,946,636
HORSESHOE OF RUBBER OR SIMILAR MATERIAL
Filed May 26, 1931
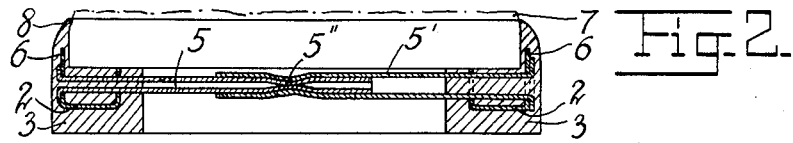
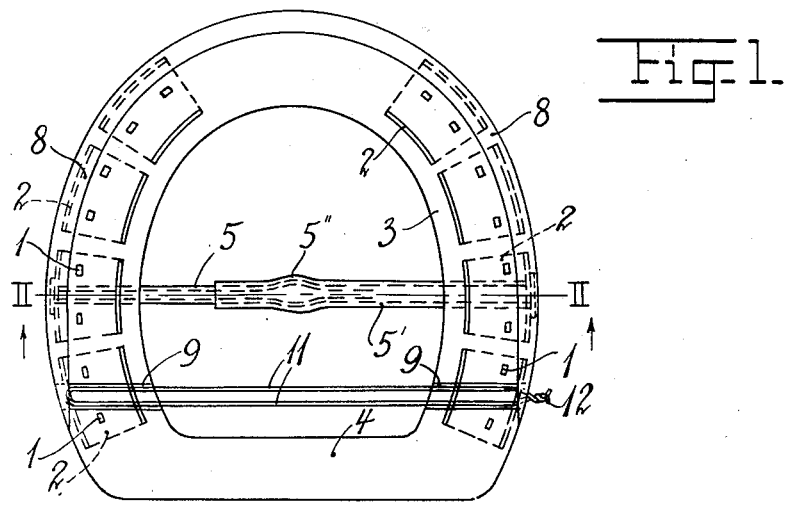
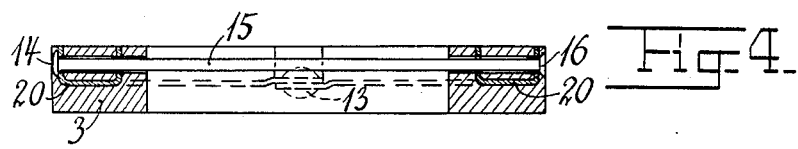
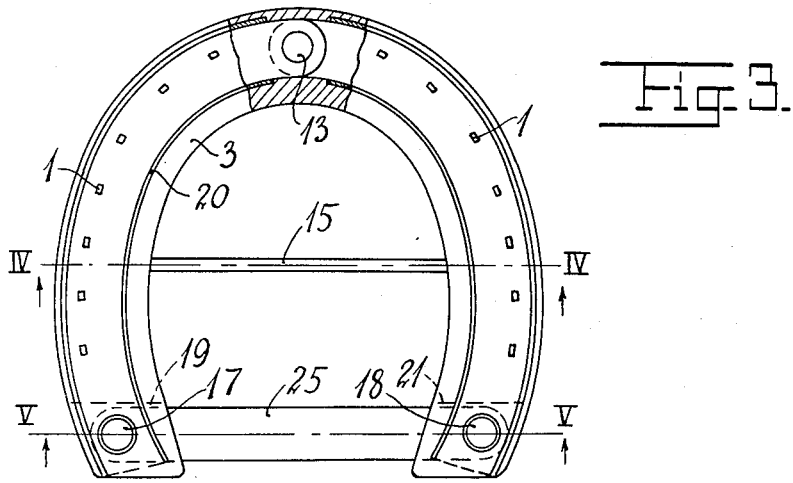
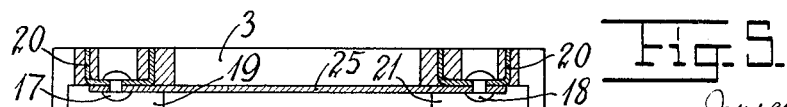

Patented Feb. 13, 1934

1,946,636

UNITED STATES PATENT OFFICE 1,946,636

HORSESHOE OF RUBBER OR SIMILAR MATERIAL

Egil Nygaard, Oslo, Norway

Application May 26, 1931, Serial No. 540,139, and in Norway June 4, 1930

6 Claims. (Cl. 168—4)

The present invention relates to horseshoes which consist of rubber or similar yielding material, in the interior of which there are embedded parts of metal or other stiff material, partly in order to reinforce the shoe and partly to afford attachments or attaching members for the ordinary horseshoe nails. Such shoes are frequently provided with changeable resilient connections extending between both rubber branches of the shoe and having for their purpose to cause said branches to remain in a relative position, wherein the nail holes in the embedded metal parts are in proper relation to the horse hoof. However, such elastic transverse members are not able to transmit forces from one shoe branch to the opposite one, because such transmission would have to take place through the elastic rubber material. If now the horse treads upon such a base so that there occurs at one hoof side a strong outwardly directed force, it may happen that the adjacent nail causes fissures in the hoof at that side or even tears out a portion of the horn wall of the hoof, whereby the horse cannot be used until the hoof has grown out again and the fissure been cured. Inconveniences of this kind do not occur in connection with iron shoes, because these are stiff enough in themselves.

The present invention has for its purpose to remove the said drawback in rubber shoes with nail-attaching inlays. This is obtained in the manner that changeable or adjustable non-elastic transverse members are so arranged in fixed connection with nail-attaching inlays at opposite side, directly or indirectly, that any outwardly directed force arising on one shoe side is partly transferred through the appertaining non-elastic transverse member to the nail attaching inlay in the opposite shoe side as a corresponding inwardly directed force. As the hoof is considerably more resistant to inwardly directed forces, a substantial increase of the total ability of the hoof to resist unfavorably directed forces is obtained.

The said transverse members may be arranged in a number of one, two, or three, and may be executed in different manners.

The annexed drawing shows several embodiments. Fig. 1 is a plan view of a rubber horseshoe provided with transverse members as mentioned above. Fig. 2 is a vertical section substantially on the line II—II of Fig. 1. Fig. 3 is a plan view of a shoe in a modified form. Figs. 4 and 5 are cross-sections on the lines IV—IV and V—V, respectively, of Fig. 3.

In Fig. 1, 1 denotes holes for shoe nails passing through nail attaching members or inlays 2 of metal embedded in the rubber body 3 of the shoe, in such a position that a curve through the nail holes follows approximately the normal nail hole curve of an ordinary iron horse shoe of the size in question, whereby the nail holes by a simple bending of the two shoe branches in relation to one another may be easily caused to take a fit position to the hoof. According to Fig. 1 this rubber forms also a rear transverse connection 4 (ring shoe). The nail inlays 2 and holes 1 are arranged as usual symmetrically, one inlay 2 on the left-hand side corresponding to a similar inlay on the opposite side.

According to my invention at least one of these nail inlays 2 on one shoe side is in fixed connection, direct or indirect, with a non-elastic transverse member 5 of metal which extends to the corresponding inlay 2 on the opposite shoe side and is fixedly connected therewith.

According to Fig. 2 the nail inlays are provided with prolongations 6 extending up against the hoof 7, and in the prolongations 6 the member 5 may be anchored. Member 5 is in this example composed of two telescopically intermeshing parts, viz.: of a hollow bar 5 and a pipe 5′ surrounding it. The outer ends of these parts may be embedded in the rubber as indicated in Fig. 1, or may be adapted to be put from the sides through holes in the finished shoe. When the shoe is to be attached to the hoof 7, its two side branches of rubber are forced somewhat together, so that the nail holes 1 will underlie the hoof correctly. If parts 5, 5′ are embedded as shown in Fig. 1, they will at once constitute a transverse member of the correct length.

Or the parts 5, 5′ are inserted from opposite sides so as to project one into the other. Then the parts are secured in position by a pinch clamping these parts flat at a suitable place as indicated at 5″. Thereby also the interconnection between the nail inlays 2 on opposite shoe sides is secured. The shoe may now be attached to the hoof in ordinary manner by means of the nails. The shoe may also first be attached to the hoof and then the transverse members 5, 5′ be inserted and tightened. The part 5 may also be a solid bar.

Preferably, although not necessary, the prolongations 6 may constitute reinforcing parts within ordinary side caps 8 on the rubber shoe. The transverse members, instead of being embedded in rubber, may be placed in upwardly open transverse grooves in the side branches as indicated at 9 in Fig. 1, which also shows transverse members consisting of a doubled wire 11, whose bight is passed through holes in nail inlays on one shoe side and whose free ends pass through similar holes in the inlay 2 on the opposite shoe side and are twisted together outside the inlay as at 12, after having been adjusted in length. The transverse members may be in the form of ribbons or plates and be attached to the inlays in several other manners. Two of them may be combined into a single stiff transverse member.

In Fig. 3 it is assumed that all nail inlays on either shoe side are united into an integral iron inlay 20. These two inlays are pivotally interconnected by a rivet 13 at the shoe front, whereby the two shoe branches may be easily adjusted relatively to one another in the transverse direction of the shoe. This adjustment being made according to the size of the hoof, the position is fixed by the transverse members, for instance by 5, 5' or 11 as described above or by a solid bar 15 which is inserted from one shoe side and has beforehand a head 14 in that end, whereas the head 16 in the other end is made by riveting. Or the transverse member may be a flat iron bar 25 which is fastened to the nail inlays 20 by rivets 17, 18, its ends being placed in recesses 19 and 21 in the rubber material 3. Such bars 25 may be held in store in different lengths, and a bar is then chosen with a length suitable in any special case.

If the inlays are made as shown in Fig. 3, it will frequently be sufficient to use a single strong member 25, if the parts 20 are stiff enough. If they are more easily deformable, two transverse members may be desirable. And if the nail inlays are a plurality of separate pieces as in Fig. 1, it might be suitable to use three members or any desired member.

I claim.

1. A horseshoe comprising a main pad body of yielding material having opposite shoe branches, nail-attaching inlays of metal so embedded in either branch of the yielding material as to enable mutual adjustment of the branches to fit the inlays in proper position to the hoof, a separate non-elastic transverse member of definite length and connecting inlays in one branch directly and non-elastically with inlays in the opposite branch in the fitted position of the branches so as to transfer an outwardly directed force on one inlay as an inwardly directed force on the connected opposite inlay.

2. A horseshoe comprising a main pad body of yielding material having opposite shoe branches, nail-attaching inlays of metal so embedded in either branch of the yielding material as to enable mutual adjustment of the branches to fit the inlays in proper position to the hoof, a separate non-elastic transverse member connecting inlays in one branch directly and non-elastically with the corresponding inlays in the opposite branch, means for enabling tightening of the transverse member when in position in the shoe, and means for securing the transverse member in tightened condition in the fitted position of the branches so as to transfer an outwardly directed force on one inlay as an inwardly directed force on the connected opposite inlay.

3. A horseshoe comprising a main pad body of yielding material having opposite shoe branches, nail-attaching inlays of metal so embedded in either branch of the yielding material as to enable mutual adjustment of the branches to fit the inlays in proper position to the hoof, a separate non-elastic transverse member connecting inlays in one branch directly and non-elastically with the corresponding inlays in the opposite branch, the transverse member consisting of two mutually adjustable parts, and means for fixedly connecting together the parts of said member in adjusted condition in the fitted position of the branches so as to transfer an outwardly directed force on one inlay as an inwardly directed force on the connected opposite inlay.

4. A horseshoe comprising a main pad body of yielding material having opposite shoe branches, nail-attaching inlays of metal so embedded in either branch of the yielding material as to enable mutual adjustment of the branches to fit the inlays in proper position to the hoof, a separate non-elastic transverse member connecting inlays in one branch directly and non-elastically with the corresponding inlays in the opposite branch, the transverse member consisting of two telescopically adjustably intermeshing parts, and means for fixedly connecting together the parts of said member in adjusted condition in the fitted position of the branches so as to transfer an outwardly directed force on one inlay as an inwardly directed force on the connected opposite inlay.

5. A horseshoe comprising a main pad body of yielding material having opposite shoe branches, nail-attaching inlays of metal so embedded in either branch of the yielding material as to enable mutual adjustment of the branches to fit the inlays in proper position to the hoof, a separate non-elastic transverse member connecting inlays in one branch directly and non-elastically with the corresponding inlays in the opposite branch, the transverse member consisting of two telescopically adjustably intermeshing parts adapted to be fixedly connected together in adjusted condition in the fitted position of the branches so as to transfer an outwardly directed force on one inlay as an inwardly directed force on the connected opposite inlay.

6. A horseshoe comprising a main pad body of yielding material having opposite shoe branches, nail-attaching inlays of metal so embedded in either branch of the yielding material as to enable mutual adjustment of the branches to fit the inlays in proper position to the hoof, a separate non-elastic transverse member connecting inlays in one branch directly and non-elastically with the corresponding inlays in the opposite branch, the transverse member consisting of two telescopically adjustably intermeshing parts, the innermost of which is tubular in portions surrounded by the uttermost part so as to enable a fixed connection of the parts of said member in adjusted condition by clamping flat the telescopically intermeshing portions at a suitable place in the fitted position of the branches so as to transfer an outwardly directed force on one inlay as an inwardly directed force on the connected opposite inlay.

EGIL NYGAARD.